Patented July 21, 1953

2,646,394

UNITED STATES PATENT OFFICE 2,646,394

REFINING OF LONG CHAIN ALIPHATIC ALCOHOLS

Ralph V. Green and Ernest P. Jensen, Charleston, W. Va., assignors to E. I. du Pont de Nemours & Company, Wilmington, Del., a corporation of Delaware No Drawing. Application December 27, 1950, Serial No. 203,020

7 Claims. (Cl. 202—57)

This invention relates to a process for recovering long chain aliphatic alcohols from reaction mixtures containing them, and more particularly relates to the treatment of reaction products from the hydrogenation of long chain fatty acids and their esters to increase the amount of alcohols recoverable therefrom.

The production of long chain alcohols in recent years has been, by and large, via the hydrogenation of corresponding acids, esters and/or glycerides, these reactions being conducted generally in the presence of a suitable hydrogenation catalyst, such as nickel, cobalt or the copper chromite catalysts of the Lazier U. S. Patents 1,964,000 and 2,000,880. Generally the hydrogenated product, which contains a multiplicity of by-products, is drawn from the converter through a cooler before reducing the hydrogenation pressure and the product filtered until free of solid catalyst. The filtered product is then subjected to various refining steps to recover the alcohols produced by the hydrogenation. Yields of long chain aliphatic alcohols from the hydrogenated fatty oils have varied over a wide range for no apparent reason and, as a consequence, no uniformity in the amount of the alcohols recovered was assured from any given amount of the fatty oils hydrogenated.

An object of the present invention is to provide a process for improving the recovery of long chain aliphatic alcohols from reaction mixtures containing them. Another object is to provide a process for improving the yields of long chain aliphatic alcohols from reaction mixtures containing them by removing from the mixtures minute amounts of dissolved metals prior to recovery of the alcohols. Yet another object is to provide a process for precipitating copper from the reaction product obtained by hydrogenating fatty oils and/or acids in the presence of copper chromite catalysts and thereafter recovering the long chain fatty alcohols therefrom by fractional distillation. Other objects and advantages of the invention will appear hereinafter.

In accord with the invention, crude reaction mixtures obtained by the catalytic reduction of fatty oils and/or acids are subjected, after removal of catalysts or metal reducing agents by filtration, to treatment for removal of dissolved metals, and the substantially metal-free crude product subjected to distillation for the recovery of the high molecular weight alcohols contained therein. The filtration of metallic catalysts, prior to separating the dissolved metals, removes the bulk of the metal catalysts employed during catalytic hydrogenation reactions. Due to the high temperatures employed during such reactions and the acidity of the fatty oils undergoing hydrogenation, appreciable amounts of metals from the catalysts are dissolved in the reaction mixture. It has been found that even though but minute quantities of the dissolved metals are present, that is as little as 200 to 500 p. p. m., inordinately low recovery of the alcohols present results. By, for example, precipitating the dissolved metals by oxalic acid or other suitable precipitating agent, filtering out the precipitated metal salts and then subjecting the metal-free solution to distillation, a surprisingly greater amount of the higher fatty alcohols can be recovered from the reaction mixture, providing the dissolved metal is reduced to 50 p. p. m. and preferably 10 p. p. m. or less.

Generally the hydrogenation of long chain fatty acids, such as oleic acid, coconut oil acids, palmitic acid, lauric acid, stearic acid, oleic acid, and such oils as China-wood, corn, peanut, castor oils and other high molecular weight vegetable and animal oil acids, together with esters of these acids, is conducted in the presence of metal oxide and metal salt catalysts. A number of catalysts are used for this purpose, such, for example, as the heavy metals and their oxides, and more particularly the salts and the oxides of zinc, nickel, copper, cadmium and chromium—outstanding catalysts for the reaction being the copper chromite catalysts of the Lazier patents supra. The Lazier catalysts are principally mixtures of copper oxide and chromic oxide which are considered to be copper chromites. These catalysts, and other suitable hydrogenation catalysts, are effective for hydrogenating the aforesaid acids and esters at temperatures ranging between 240 and 400° C. and under pressures ranging from 300 to 5000 lbs./sq. inch or higher.

The invention of the instant case is principally directed to the treatment of the filtered crude reaction products, i. e., the filtered reaction mixture from hydrogenation, prior to recovery of the long chain aliphatic alcohols present therein. It has been found that the presence of the dissolved metals, and more particularly dissolved copper usually found combined with the fatty acid and/or ester, which has been subjected to hydrogenation, inhibits the recovery of the long chain aliphatic alcohols. Without the separation of the dissolved copper, in many instances, no long chain alcohol can be recovered, while from the same hydrogenated oil excellent yields of the long chain aliphatic alcohols can be obtained, providing substantially all of the dissolved metals are removed prior to the recovery step.

The examples provide particular embodiments of the invention in which parts are by weight unless otherwise indicated.

*Example 1.*—Into a pressure resisting autoclave of about 400 gallon capacity, there is pumped 1900 lbs. of palmitic acid, together with about 100 lbs. of a copper chromite catalyst having the formula $9CuO$—$CuCr_2O_4$. The autoclave and contents are heated to a temperature between 200° C. to 300° C. and hydrogen introduced until a pressure between 4500 and 4800 lbs./sq. inch is obtained. As the hydrogen is consumed, additional hydrogen is introduced to maintain the pressure at approximately 4500 lbs./sq. inch. When no more hydrogen is consumed the charge is cooled to about 200° C. and discharged from the converter through a cooler to a filter press for the removal of the catalyst present. The thus filtered hydrogenated product is then placed in a precipitation tank wherein 0.15% by weight of aqueous oxalic acid is introduced. This precipitation is conducted at a temperature between 50 and 100° C., the precipitated copper oxalate removed by filtration and the metal-free hydrogenated product then subjected to distillation for the recovery of the alcohols present. The refining by distillation is conducted by pumping the treated and filtered hydrogenated product into a batch still and distilling at a pressure of 10 mm. Hg absolute.

*Example 2.*—A sample of the filtered hydrogenated product obtained by hydrogenating palmitic acid as described in Example 1, before treating with oxalic acid, contained 300 p. p. m. of dissolved metals, mainly copper, and upon refining by the usual distillation procedure at 10 mm. Hg absolute pressure yielded the following fractions:

| | Percent |
|---|---|
| Low boilers | 20 |
| Cetyl alcohol | 50 |
| Stearyl alcohol | 10 |
| High boilers | 20 |

*Example 3.*—A sample of the same filtered hydrogenated product as was used in Example 2, which contained 300 p. p. m. of dissolved metals, was treated with oxalic acid and filtered. The dissolved metals were reduced to 5 p. p. m. and upon refining by the usual distillation procedure at 10 mm. Hg absolute pressure yielded the following fractions:

| | Percent |
|---|---|
| Low boilers | 17 |
| Cetyl alcohol | 56 |
| Stearyl alcohol | 10 |
| High boilers | 17 |

The recovery of cetyl alcohol is increased from 50 to 56% by treatment of the filtered hydrogenated product with oxalic acid which is equivalent to an increase of 12% in the amount of valuable product recovered. In addition, the quality of the cetyl alcohol recovered in Example 3 is superior to that recovered in Example 2 as is evidenced by a higher hydroxyl number, 230 vs. 218, and a lower iodine number, 0.5 vs. 4.0.

*Example 4.*—A sample of filtered hydrogenated palmitic acid contained 490 p. p. m. of dissolved metals. After treating with 0.15% of aqueous oxalic acid and filtering, the dissolved metals were reduced to 30 p. p. m. Another portion was treated with 0.15% aqueous oxalic acid but the precipitated metal oxalates were not filtered out. Refining of these three samples by the usual distillation procedure yielded the following fractions:

| | Untreated | Oxalic Acid Treated | |
|---|---|---|---|
| | | Filtered | Not Filtered |
| | Percent | Percent | Percent |
| Low boilers | 18 | 17 | 20 |
| Cetyl alcohol | 67 | 71 | 71 |
| Stearyl alcohol | 4 | 6 | 4 |
| High boilers | 11 | 6 | 5 |

Analysis of the cetyl alcohol fraction is as follows:

| | Untreated | Oxalic Acid Treated | |
|---|---|---|---|
| | | Filtered | Not Filtered |
| | ° C. | ° C. | ° C. |
| Melting point | 46.5 | 47.3 | 47.5 |
| Hydroxyl number | 220 | 230 | 228 |
| Iodine number | 1.3 | 0.19 | 0.16 |

As illustrated by the examples, oxalic acid is used to precipitate the dissolved metals from the crude product, the precipitate being removed by filtration. Other methods of separating the metals present may be employed such, for example, as by electrolysis of the reaction mixture, precipitation with organic or inorganic acids that produce insoluble metal salts in the crude reaction mixture, for example, as carbon dioxide or carbonate salts, or any other suitable method may be used which will separate the metals from this solution down to 50 p. p. m. or less.

When oxalic acid is employed, very small amounts appear to be sufficient to remove copper from the solution. From 0.01 to 0.5% of the oxalic acid, based on the crude hydrogenated oil, is usually sufficient to precipitate up to about 750 p. p. m of the copper from such a solution. The oxalic acid may be added to the crude hydrogenated oil as such or dissolved in a solvent for the oxalic acid.

After precipitating the metal salt from the crude oil, the precipitate is separated by filtration and the metal-free hydrogenated oil subjected to distillation under atmospheric or reduced pressure. It is not necessary to separate the precipitated copper salts prior to distillation, N. B. Example 4. It is often desirable to do so, however, if a highly purified product must be made.

The process of the invention is applicable to the treatment of fatty acids and their esters generally after hydrogenation for the recovery of the corresponding alcohols. For example, from palmitic acid, which has been hydrogenated with a copper chromite catalyst, cetyl alcohol yields have varied from 0 to 60% when the dissolved copper was not first separated from the crude oil after hydrogenation and prior to distillation for recovery of the alcohols. After separation, yields were increased to from 5 to 15% above the yields obtained without removal of dissolved copper. The invention is applicable to such hydrogenation processes generally, not only to improve the yields but also to improve the quality of the alcohols produced.

We claim:

1. In a process for the recovery of long chain aliphatic alcohols from the reaction mixture obtained by the hydrogenation of compounds of the group consisting of corresponding long chain aliphatic acids and their esters in the presence of a metal hydrogenation catalyst, the steps which comprise separating by filtration the solid catalyst from the reaction mixture and thereafter precipitating dissolved metals from the solid catalyst-free reaction mixture from hydrogenation to give less than 50 p. p. m. of dissolved metal prior to recovering the long chain aliphatic alcohols therefrom by distillation.

2. In a process for the recovery of long chain aliphatic alcohols from the crude reaction mixture obtained by the hydrogenation of compounds of the group consisting of corresponding long chain aliphatic acids and their esters by a hydrogenation reaction in which copper chromite is employed as the catalyst, the steps which comprise separating by filtration the solid copper catalyst present from the reaction mixture and thereafter precipitating dissolved copper from the solid catalyst-free mixture from hydrogenation to give less than 50 p. p. m. of dissolved copper prior to recovering the long chain aliphatic alcohols therefrom by distillation.

3. The process of claim 2 in which the dissolved copper is precipitated with oxalic acid as copper oxalate and the precipitated copper oxalate removed by filtration prior to recovery of the long chain aliphatic alcohols.

4. In a process for the recovery of cetyl alcohol from the crude reaction mixture obtained by the hydrogenation of palmitic acid in the presence of copper chromite catalyst at a temperature between 240° C. and 400° C. and under a pressure between 300 and 5000 lbs./sq. inch, the steps which comprise separating the solid copper chromite catalyst by filtration from the reaction mixture and thereafter removing sufficient dissolved copper from the crude mixture from hydrogenation to reduce the copper content to less than 50 p. p. m. of dissolved copper and thereafter recovering the cetyl alcohol by distillation.

5. In a process for the recovery of cetyl alcohol from the crude reaction mixture obtained by the hydrogenation of palmitic acid in the presence of copper chromite catalyst at a temperature between 240° C. and 400° C. and under a pressure between 300 and 5000 lbs./sq. inch, the steps which comprise separating by filtration the solid copper chromite catalyst from the reaction mixture and thereafter precipitating sufficient dissolved copper from the crude mixture from hydrogenation with oxalic acid to reduce the dissolved copper content to less than 50 p. p. m. and thereafter recovering the cetyl alcohol by distillation.

6. In a process for the recovery of long chain aliphatic alcohols from the reaction mixture obtained by the hydrogenation of compounds of the group consisting of corresponding long chain aliphatic acids and their esters in the presence of a metal hydrogenation catalyst, the steps which comprise separating the solid catalyst from the reaction mixture by filtration and thereafter removing dissolved metals from the solid catalyst-free reaction mixture from hydrogenation to give less than 50 p. p. m. of dissolved metal prior to recovering the long chain aliphatic alcohols therefrom by distillation.

7. In a process for the recovery of cetyl alcohol from the crude reaction mixture obtained by the hydrogenation of palmitic acid in the presence of copper chromite catalyst at a temperature between 240° C. and 400° C. and under a pressure between 300 and 5000 lbs./sq. inch, the steps which comprise separating a major portion of the solid copper chromite catalyst from the reaction mixture by filtration, removing sufficient dissolved copper from the crude mixture from hydrogenation to reduce the copper content to less than 50 p. p. m. and thereafter recovering the cetyl alcohol by distillation.

RALPH V. GREEN.
ERNEST P. JENSEN.

References Cited in the file of this patent

UNITED STATES PATENTS

| Number | Name | Date |
|---|---|---|
| 2,080,419 | Green | May 18, 1937 |
| 2,109,844 | Lazier | Mar. 1, 1938 |
| 2,158,040 | Blumenfeld | May 9, 1939 |
| 2,186,272 | Wyler | Jan. 9, 1940 |
| 2,538,034 | Peppel | Jan. 16, 1951 |